(12) United States Patent
Schliwa et al.

(10) Patent No.: US 9,802,706 B2
(45) Date of Patent: Oct. 31, 2017

(54) ADAPTOR FOR MOUNTING A SEAT IN A CABIN OF A VEHICLE, SEAT FOR A CABIN OF A VEHICLE AND VEHICLE WITH A CABIN AND A SEAT

(71) Applicant: Airbus Operations GmbH, Hamburg (DE)

(72) Inventors: Ralf Schliwa, Hamburg (DE); Maria Theresia Strasdas, Hamburg (DE); Jan-Ole Jedraszczyk, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 647 days.

(21) Appl. No.: 14/483,523

(22) Filed: Sep. 11, 2014

(65) Prior Publication Data

US 2014/0375086 A1    Dec. 25, 2014

Related U.S. Application Data

(63) Continuation of application No. PCT/EP2013/055674, filed on Mar. 19, 2013.
(Continued)

(30) Foreign Application Priority Data

Mar. 23, 2012 (DE) .................. 10 2012 005 980

(51) Int. Cl.
*B64D 11/06* (2006.01)

(52) U.S. Cl.
CPC .......... *B64D 11/0696* (2013.01); *B64D 11/06* (2013.01); *B64D 11/0689* (2013.01); *B64D 11/0691* (2014.12)

(58) Field of Classification Search
CPC combination set(s) only.
See application file for complete search history.

(56) References Cited

U.S. PATENT DOCUMENTS 3,594,037 A    7/1971  Sherman et al.
4,460,215 A    7/1984  Chamberlain et al.
(Continued)

FOREIGN PATENT DOCUMENTS

CN    101909935 A    12/2010
DE    3629505 A1     3/1988
(Continued)

OTHER PUBLICATIONS

State Intellectual Property Office of the Peoples' Republic of China, Office Action for Chinese Patent Application No. 201380015461.X dated Jul. 3, 2015.
(Continued)

*Primary Examiner* — Christopher P Ellis
(74) *Attorney, Agent, or Firm* — Lorenz & Kopf, LLP

(57) ABSTRACT

An adapter for receiving a vehicle attendant seat in a cabin of a vehicle comprises a flat retaining body, a receiving device for a vehicle attendant seat, at least one first pivoting means and at least one first securing means. The at least one first pivoting means is arranged on a pivoting edge of the retaining body and is adapted for forming a hinge with at least one correspondingly formed second pivoting means. The receiving device is arranged on a surface of the at least one retaining body, which surface extends parallel to the plane, and is adapted for mechanically connecting the vehicle attendant seat with the at least one retaining body. Thus in a vehicle cabin a vehicle attendant seat may be accommodated in a very space-saving manner even at locations to which in conventional vehicle operation access is required.

19 Claims, 10 Drawing Sheets

Related U.S. Application Data

(60) Provisional application No. 61/614,727, filed on Mar. 23, 2012.

(56) References Cited

U.S. PATENT DOCUMENTS

| | | | |
|---|---|---|---|
| 4,580,832 | A | 4/1986 | Maruyama et al. |
| 4,740,030 | A * | 4/1988 | Nordskog ................ A47C 9/06 16/289 |
| 4,799,632 | A | 1/1989 | Baymak et al. |
| 4,845,438 | A | 7/1989 | Oldach |
| 4,902,069 | A * | 2/1990 | Lehnert ............. B64D 11/0691 297/14 |
| 4,993,666 | A * | 2/1991 | Baymak ................... B09B 1/00 244/122 R |
| 5,335,963 | A | 8/1994 | Muller et al. |
| 6,079,669 | A | 6/2000 | Hanay et al. |
| 7,905,451 | B2 | 3/2011 | Schotte et al. |
| 8,469,448 | B2 | 6/2013 | Mori et al. |
| 8,672,267 | B2 | 3/2014 | Schliwa et al. |
| 8,740,144 | B2 | 6/2014 | Goehlich et al. |
| 8,770,659 | B2 | 7/2014 | Isherwood et al. |
| 9,511,867 | B2 * | 12/2016 | Schliwa ............. B64D 11/0691 |
| 2011/0011979 | A1 * | 1/2011 | Weil ....................... B60N 2/305 244/122 R |
| 2012/0251235 | A1 | 10/2012 | Klaukien |
| 2013/0126672 | A1 * | 5/2013 | Weitzel ................. B64D 11/06 244/118.6 |
| 2013/0313365 | A1 * | 11/2013 | Ehlers ................... B64D 11/06 244/118.6 |
| 2013/0334369 | A1 * | 12/2013 | Schliwa ................ B64D 11/02 244/118.5 |
| 2014/0209741 | A1 | 7/2014 | Boenning et al. |
| 2017/0043857 | A1 * | 2/2017 | Seibt ..................... B64C 1/1407 |
| 2017/0106983 | A1 * | 4/2017 | Castanos ........... B64D 11/0691 |

FOREIGN PATENT DOCUMENTS

| | | |
|---|---|---|
| DE | 8626158 U1 | 1/1989 |
| DE | 102005009750 A1 | 9/2006 |
| EP | 0867365 A2 | 9/1998 |
| GB | 2288728 | 11/1995 |
| WO | 2012110643 A1 | 8/2012 |

OTHER PUBLICATIONS

European Patent Office, European Search Report for European Patent Application No. 14185764.9 dated Feb. 20, 2015.

ISA European Patent Office, International Search Report for International Patent Application No. PCT/EP2013/055674 dated Jun. 13, 2013.

German Patent Office, German Search Report for German Application No. 10 2013 110 500.9 dated May 8, 2014.

German Patent Office, German Search Report for German Application No. 10 2012 005 980.9 dated Nov. 7, 2012.

European Patent Office, Written Opinion of the International Searching Authority for International Patent Application No. PCT/EP2013/055674 dated Jun. 13, 2013.

* cited by examiner

ADAPTOR FOR MOUNTING A SEAT IN A CABIN OF A VEHICLE, SEAT FOR A CABIN OF A VEHICLE AND VEHICLE WITH A CABIN AND A SEAT

CROSS-REFERENCE TO RELATED APPLICATIONS

This is a continuation of International Application No. PCT/EP2013/055674, filed Mar. 19, 2013, which application claims priority to German Patent Application No. 10 2012 005 980.9, filed Mar. 23, 2012, and to U.S. Provisional Patent Application No. 61/614,727, filed Mar. 23, 2012, which are each incorporated herein by reference in their entirety.

TECHNICAL FIELD

The technical field relates to an adapter for mounting a seat in a cabin of a vehicle, to a seat for a cabin of a vehicle, to a vehicle with a cabin and a seat arranged therein.

BACKGROUND

One of the objects in equipping passenger cabins in means of transport relates to optimizing space available for passengers, which is reflected in the number of seats provided. The number of seats available for passengers is, among other things, limited by the number of prescribed seats for members of the cabin crew, by prescribed safety equipment, supply facilities and toilets. The ratio of the number of passenger seats to other equipment in passenger cabins is a factor that helps determine the economic efficiency of an aircraft in regular service. Apart from regulations, issued by authorities, relating to type certification and approval to operate means of transport, in the selection of seat sizes, seat pitches, supply facilities and toilets it is also necessary to include customer requirements, for example customer-specific special installations by operators of the means of transport.

Saving cabin attendant seats or positioning them at locations within the cabin, which locations cannot be used for carrying passengers, is not possible. During flight phases in which it is compulsory to remain seated and to have seat belts fastened, it is mandatory for cabin attendants to have a complete overview of the cabin. Consequently cabin attendant seats exist that are foldable and thus designed to be relatively space-saving.

DE 36 34 839 C2 discloses a cabin attendant seat in an opposed double arrangement with a backrest and a foldably mounted seat surface for each subordinate seat.

DE 4 125 958 discloses a cabin attendant seat integrated in a passenger seat row instead of a passenger seat.

DE 10 2005 009 750 B4 discloses an arrangement comprising a seat and a cabin attendant seat, wherein the cabin attendant seat is arranged directly behind the seat, when viewed in the direction of flight, while as a result of pivotable mounting nevertheless making it possible for the seat to be pivoted back.

Furthermore, cabin attendant seats are known that are arranged on a floor-guided pedestal that is pivotably arranged.

In addition, other objects, desirable features and characteristics will become apparent from the subsequent summary and detailed description, and the appended claims, taken in conjunction with the accompanying drawings and this background.

SUMMARY

While a space-saving design of a cabin attendant seat may reduce the space taken up by it, nevertheless as a result of the predominantly fixed arrangement of such seats on cabin monuments or on heavy and bulky pedestals practically no significant space savings result.

According to the various teachings of the present disclosure, provided is a device for accommodating or mounting a vehicle attendant seat in a cabin of a vehicle, which device makes it possible to particularly advantageously utilize the available design space so that more space for passenger seats is created in the cabin of the vehicle.

In an embodiment an adapter for receiving a vehicle attendant seat in a cabin of a vehicle comprises a retaining body with an upper edge, a lower edge, a height (h) and a width (b) taken up by a pivoting edge, a receiving device for a vehicle attendant seat, at least one first pivoting means and at least one first securing means, wherein the outer contours of the retaining body span a plane, the at least one first pivoting means is arranged on the pivoting edge of the retaining body and is adapted for forming a hinge with at least one correspondingly formed second pivoting means, and the receiving device is arranged on a surface of the at least one retaining body, which surface extends parallel to the plane and is adapted for mechanically connecting the vehicle attendant seat with the at least one retaining body.

The adapter is thus a largely planar component, which does not, however, mandatorily need to comprise a closed surface, but may also be designed in the form of a frame or a combination of a frame and closed planar components. As a result of the at least one first pivoting means arranged thereon, the retaining body may be fastened to vehicle-fixed bearing fittings. For mounting the seat to the retaining body the receiving device is used which may, in one example, be designed in the form of holes, butt straps, bushes or other commonly used means that make it possible to arrange the seat on a surface or a pillar in a cabin, which pillar is largely independent of further installations. The at least one first pivoting means allows for the pivoting movement, while the at least one first securing means makes it possible to secure the adapter and thus the pivotable vehicle attendant seat. The securing means may be implemented in whatever manner that allows securing, for example in the form of a butt strap or the like into which a hook or some other correspondingly formed second securing means is insertable.

Usually, seats in a vehicle are mounted on an immovable object, for example a wall of a monument in an aircraft cabin, or on a pivotable or rotatable pedestal that in a floor-guided manner may be moved from a first position to a second position. In contrast to this a wall-like component is proposed which is affixable by at least one first pivoting means, for example hinge fittings, in a vehicle, for example to a partition wall, to installations such as monuments or other cabin equipment components. Such an adapter is associated with an advantage in that in this manner it is possible to mount a vehicle attendant seat in those locations within a vehicle cabin which are not usually provided for this. This includes, in particular, locations that need to be utilized during normal operation of an aircraft, while due to regulations they are, however, not allowed to be used or entered during takeoff and landing. This relates, for example, to access ways to toilets, galleys, to a cockpit, to a rest compartment or to some other facilities.

By correspondingly affixing the adapter according to the present disclosure, nevertheless at this position a vehicle attendant seat may be arranged that during takeoff and landing may be pivoted to an in-use position which is, for example, positioned directly in front of an access way. However, in the remaining phases the adapter may be pivoted to a stowed position so that the access way may be used again.

A further advantage of using a retaining body with at least one first pivoting means consists of any seat that has already been certified for use in the particular vehicle not having to be certified anew. Instead, it is sufficient to certify the adapter in order to be able to use already existing seats.

In one embodiment the at least one first securing means is arranged on the retaining body so as to be spaced apart from the at least one first pivoting means. In this manner a lever arm to a hinge axis of the first pivoting means may be implemented, which lever arm ensures safe securing of the retaining body.

In one embodiment the at least one first securing means is arranged on a securing edge that is situated opposite the pivoting edge. The hinge arrangement is adapted for making it possible to pivot the retaining body on the pivoting edge. Securing in an in-use position is required because, for example in an aircraft, design considerations assume instances of acceleration in the order of 16 g. Arranging a first securing means at a location spaced apart from the pivoting edge results in clear relief of the retaining body in an in-use position. For example, when the retaining body is pivoted in front of an access way to a toilet, the pivoting edge and the second securing means may be arranged on two opposite edges of the toilet monument in question.

In one embodiment the retaining body has a width (b) that is smaller than the height (h). In this way in a narrow space with little space required for pivoting, there is adequate room for a vehicle attendant seat.

In one embodiment the retaining body is adapted for taking up a variable width. This may, for example, be achieved by a telescopic guide, by means of which part of the retaining body may be extended on the telescopic guide. In this manner the adapter may, in addition to receiving a vehicle attendant seat, carry out the function of a barrier grid, which is useful, in particular, for arranging stairways leading up or down.

In one embodiment the retaining body comprises an access opening with a closure means that is openable, which access opening is arranged in a region facing the lower edge of the retaining body in order to reach a stowage compartment in the vehicle attendant seat from a side of the retaining body, which side is opposite the receiving device. Usually a cabin attendant seat comprises a stowage compartment that accommodates emergency equipment. Such emergency equipment may include a life jacket or a torch, which have to be accessible both in an in-use position and in a stowed position.

In one embodiment the adapter furthermore comprises an electrical connector device that is arranged on the retaining body. In this way it is possible on the retaining body itself to provide a connector device for connecting electrical components of a cabin attendant seat so that no modifications to the seat need to be carried out. In order to ensure prescribed functions the vehicle attendant seat comprises, for example, a wired telephone or handset. Moreover, other electrical equipment may be integrated, including, for example, a switch for an illuminating device, also known as a worklight switch, an illuminating device, a seat heater, a massage device, etc. They are to be provided with adequate electrical power.

One embodiment comprises at least one electrical line that extends from the electrical connector device to the pivoting edge. In this manner the electrical connector device may be supplied with electrical power by way of a line, wherein the line may be connected to a vehicle-fixed part by way of the pivoting edge. In this arrangement the electrical line is arranged on an electrical network, bus or the like.

For use in some aircraft it is preferred if the electrical connector device is arranged in a region near the lower edge of the retaining body, because some available cabin attendant seats in a lower region comprise an electrical connector device. Furthermore, cabin attendant seats exist in which the electrical connector device is positioned directly underneath a section edge to a headrest so as to minimize as far as possible cable lengths used in the interior of the seat.

In an embodiment the at least one electrical line is placed over the at least one first pivoting means in order to be led to a vehicle-fixed part by way of at least one second pivoting means. This is the mechanically simplest variant for connecting the electrical item of equipment. However, in the case of frequent pivoting of the retaining body it must be ensured that on the one hand the cable used is of adequate length and is not stretched during the pivoting movement, and on the other hand that in order to prevent spatial interference the cable length is not excessive. Furthermore, when selecting the material of the cable it should be ensured that to the greatest extent possible brittle cracks or brittle fractures resulting from frequent bending of the cable are prevented.

In an embodiment the at least one electrical line is connected to a rotatable slip ring arrangement that is arranged on the at least one first pivoting means. Thus any damage to cables may safely be prevented.

An embodiment comprises a foldable supporting device that is arranged on a side of the retaining body, which side is opposite the receiving device and that is adapted for connecting, by its end facing away from the retaining body, to a vehicle-fixed part. This may, for example, comprise the floor of a cabin and is used to further reduce the load acting on the hinge arrangement. Likewise it is possible to mount the adapter at such a position in the cabin from which a direct view of the cabin is provided, wherein, however, there is no directly adjacent wall. In this arrangement the supporting mechanism may be understood to be a first securing means, wherein the matching counterpart on the floor or on other components may be understood to be the second securing means. The supporting mechanism comprises, for example, at least one supporting brace that when folded out may, at least on one end, be spaced apart from the retaining body.

The present disclosure further relates to a cabin arrangement in a vehicle, which cabin arrangement comprises a floor area, at least one cabin equipment component with at least two bearing fittings, and an adapter, connected by way of the at least one first pivoting means to the at least one second pivoting means, as described above.

Furthermore, the cabin arrangement may comprise a second securing means, arranged on the at least one cabin equipment component, which securing means is shaped so as to correspond to the at least one first securing means of the adapter. In this arrangement the bearing fittings and the at least one second securing means are arranged on the at least one cabin equipment component in such a manner that the adapter in an in-use position closes an opening defined by the at least one cabin equipment component. This opening may form part of a passage or an access way that during normal flight operation must not be used, for example because of regulations.

In one embodiment the opening may also be designed as a through-opening. Moreover, the opening may be associated with an inwards-directed offset of the at least one cabin equipment component. The at least one cabin equipment component may, furthermore, be selected from a group of cabin equipment components, wherein the group may comprise a toilet module, a galley module, a stowage module, a rest compartment module, a stairway access, a partition wall to a cockpit, and any combinations of the aforesaid.

A cabin of a vehicle may accommodate such an adapter with a seat arranged thereon in various locations. In one example, in the case of the above-mentioned cabin equipment components, the adapter is arranged in a "dead end", wherein the term "dead end" denotes a passage that is not an emergency escape route. Normally such dead ends are defined by a passage width that in order to provide as compact an arrangement as possible in a cabin is relatively narrow. Likewise preferred is the use of the adapter in front of a stowage device, for example a galley, a stowage compartment, a wardrobe, a switchgear cabinet and the like.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
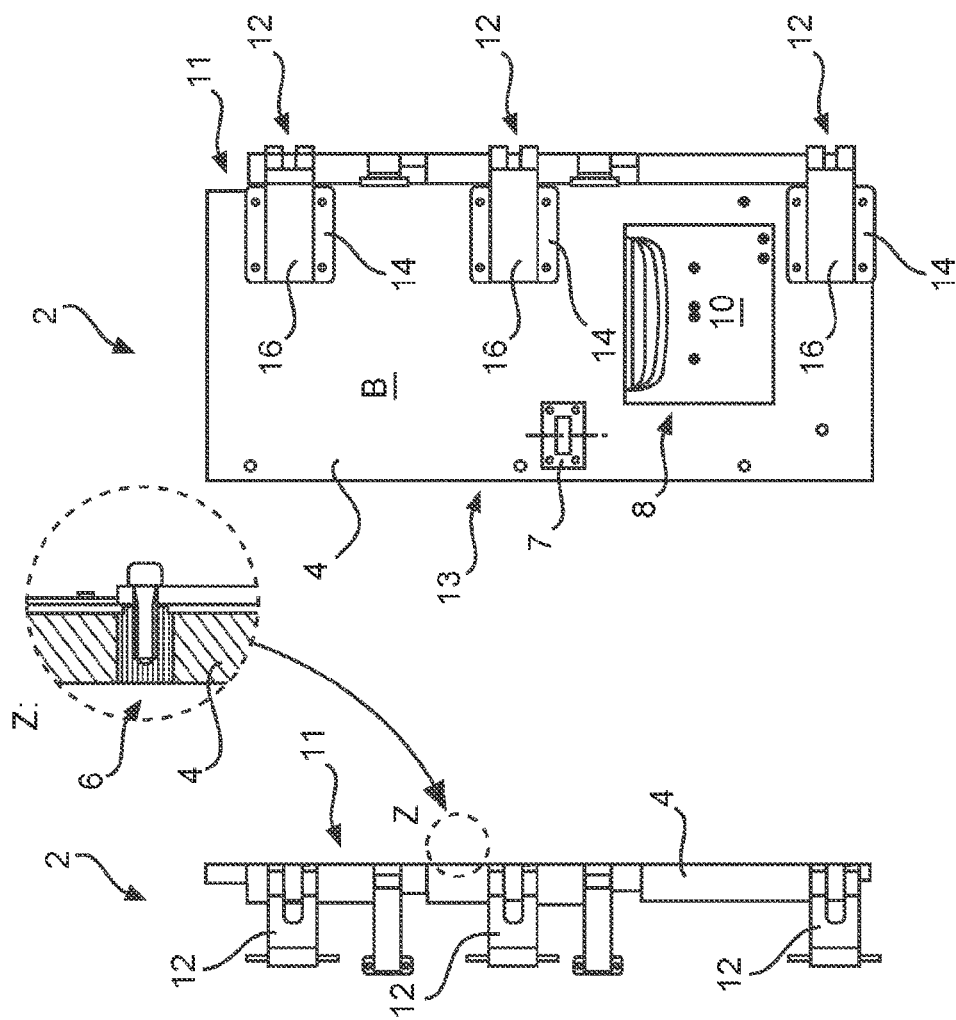
FIG. 1 shows a three-sided view of an adapter.
Figure 1:
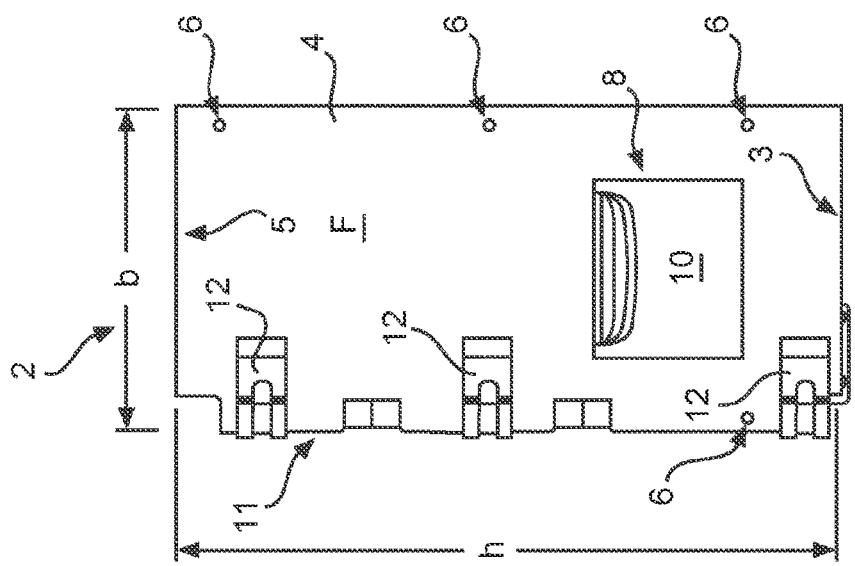

FIG. 1 shows a three-sided view of an adapter 2 according to the various teachings of the present disclosure. The front F of a retaining body 4 with a lower edge 3, an upper edge 5, a width b and a height h comprises a receiving device 6 in the form of holes or inserts. A vehicle attendant seat (not shown in FIG. 1) may be screwed to the aforesaid so that said vehicle attendant seat is firmly connected to the retaining body 4. In addition, an opening 8 is provided that is closable by means of a flap 10. Thus it is possible from the rear B to access a stowage compartment that is arranged on a lower end of a vehicle attendant seat to be affixed to the front F.

On a pivoting edge 11 a total of three hinge fittings 12 are arranged as first pivoting means that are designed in the form of hinge forks and that are suitable for forming a hinge arrangement with correspondingly shaped bearing fittings as second pivoting means. Of course, it is also possible to use other known pivoting means without leaving the scope of protection of the present disclosure. The hinge fittings 12 are spaced apart from each other, wherein in the variant shown the spacing is not uniform. In terms of technical utility an equidistant arrangement of hinge fittings 12 is not necessary, the precise position of the hinge fittings 12 should match the characteristics of vehicle attendant seats that may be used.

A view of the rear B of the retaining body 4 illustrates the mounting arrangement of the hinge fittings 12. As an example, the aforesaid in each case comprise a retaining plate 14 that is connected to a profile body 16 from which the actual fork or fork shape follows on. With the use of the, for example, relatively wide retaining plate 14 a large-area screw arrangement results, which favours, in particular, the use of lightweight construction materials for the retaining body 4, for example honeycomb panels or the like. For favourable introduction of the force into the retaining body 4, force introduction fittings may be laminated-in in that location, which force introduction fittings are, for example, disclosed in WO 2011/073 099 A1.

A detail Z shows the screw connection of a cabin attendant seat on the retaining body 4 in a receiving device 6 in the form of a hole. Of course, this represents only one exemplary embodiment; it is always possible to use other screwing means or different holes or inserts or insert components.

A first securing means 7 may be arranged on the rear B, for example in close proximity to a securing edge 13 facing away from the pivoting edge 11. The first securing means 7 is, for example, designed as a butt strap. As explained above, further embodiments are imaginable, in one example, positive-locking securing means.

Figure 2:
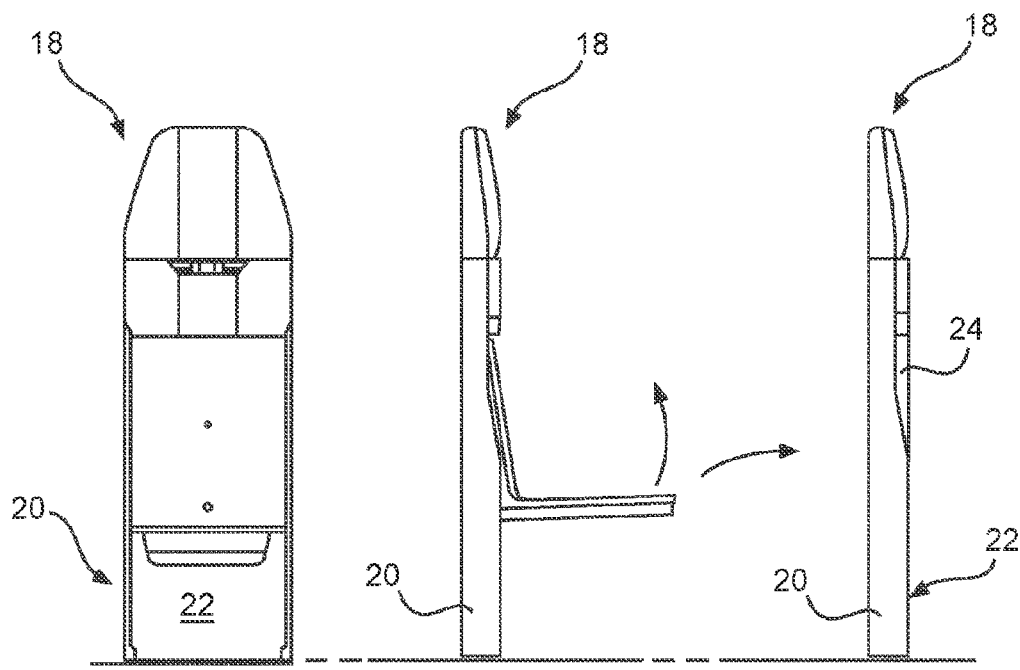
FIG. 2 shows a two-sided view of a commonly-used certified cabin attendant seat that may be mounted on the adapter.

FIG. 2 shows a front view and two lateral views of a commonly used cabin attendant seat 18 that may be screwed to the above-mentioned adapter 2. The vehicle attendant seat 18 has a largely even width, for example of about 44 cm, that is sufficient for a cabin attendant to be seated for a short time. On the lower end a stowage compartment 20 is arranged in which emergency equipment, for example a life vest and a torch, is accommodated. The stowage compartment 20 is closable by means of a flap 22.

The region on the rear of the cabin attendant seat 18, which region accommodates the stowage compartment 20, should at least in some regions correspond to the opening 8 of the retaining body 4. Generally speaking, the opening 8 of the retaining body 4 may also be dimensioned so as to be significantly smaller than the closure flap 22 of the stowage compartment 20. However, it must be possible to reach the stowage compartment 20 by way of the opening 8 on the rear of the vehicle attendant seat 18.

As shown in the first lateral view, the vehicle attendant seat 18 comprises a swing-out seat element 24. In the right-hand lateral view the seat element 24 is folded up, while in the left-hand lateral view the seat element 24 is folded down, for use, to an approximately horizontal position.

Figure 3:
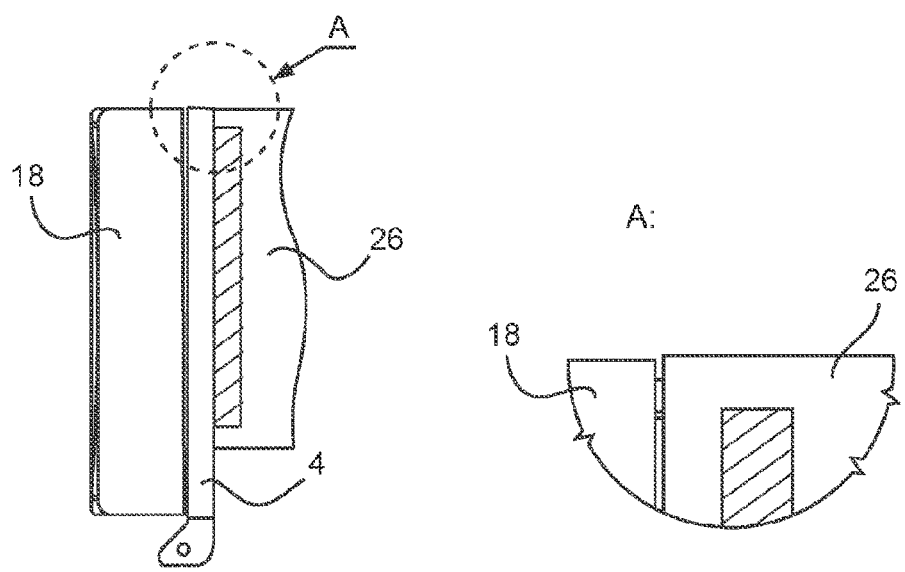
FIG. 3 shows a top view of an arrangement of a cabin attendant seat on the adapter.

FIG. 3 shows the general arrangement of a vehicle attendant seat 18 on the retaining body 4. The illustration shows that the vehicle attendant seat 18 extends practically over the entire width of the retaining body 4. The hinge fittings 12 project beyond the corresponding lateral edge of the vehicle attendant seat 18 so that unhindered pivoting of the retaining body 4 and thus of the vehicle attendant seat 18 is made possible. Merely as an example, the retaining body 4 is arranged on a galley monument 26.

Figure 4:
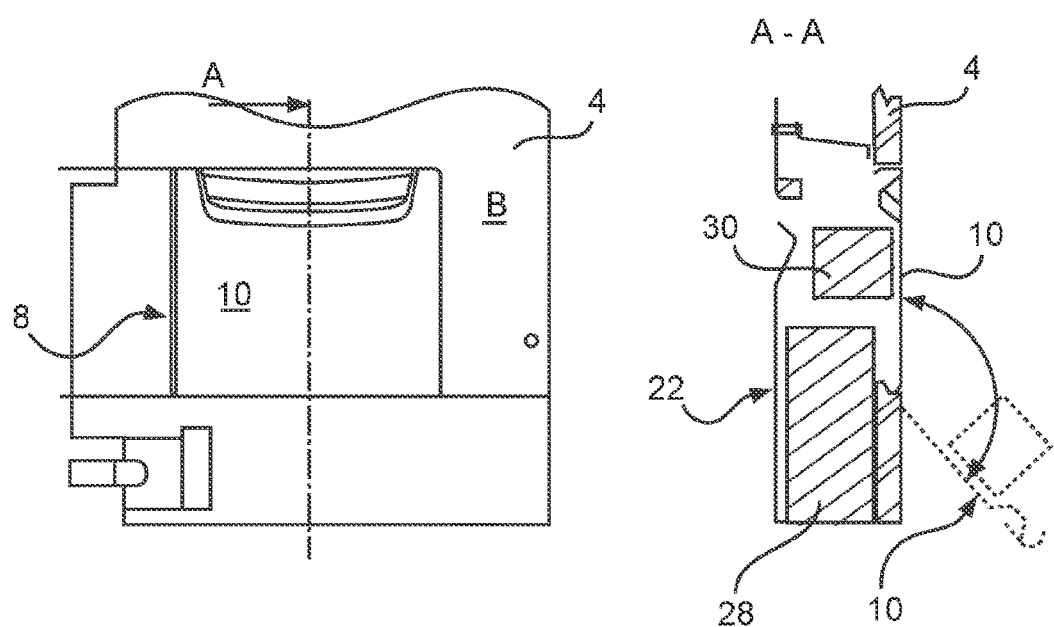
FIG. 4 shows a detail of a lower region of an adapter and of a cabin attendant seat arranged thereon.

FIG. 4 shows the rear B of the retaining body 4 with the opening 8 arranged therein, which opening 8 is closed by way of a closure flap 10. On the opposite side there are the closure flap 22 of the vehicle attendant seat 18 and emergency equipment 28 and 30 arranged in the stowage compartment 20.

Figure 5A:
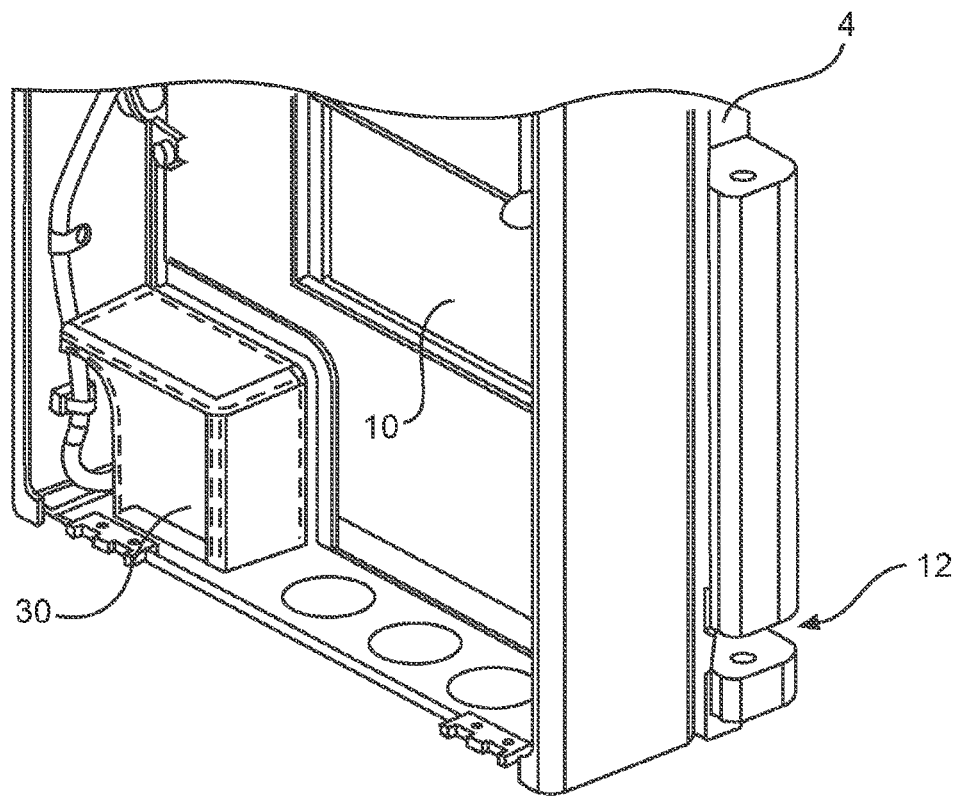
FIGS. 5A to 5C show the electrical equipment for electrically connecting a vehicle attendant seat.

In some cases it is prescribed to provide a vehicle attendant seat 18 with an electrical connection for a handset. FIG. 5A demonstrates that instead of carrying out modifications to a vehicle attendant seat 18 it is possible to design the retaining body 4 in such a manner that commonly-used connection options of vehicle attendant seats are made useable. In the vehicle attendant seat 18 known from FIG. 2, purely as an example, in the left-hand lower corner at least one connection option for a handset is provided. This may be used by way of an electrical connector device 30 on the retaining body 4. The aforesaid may be designed as a connection socket in which an electrical connection to the vehicle attendant seat may be established. Of course, the electrical connector device 30 may also be arranged in other locations of the retaining body if the seat to be affixed comprises in some other location the connections necessary for providing electrical power.

Figure 5B:
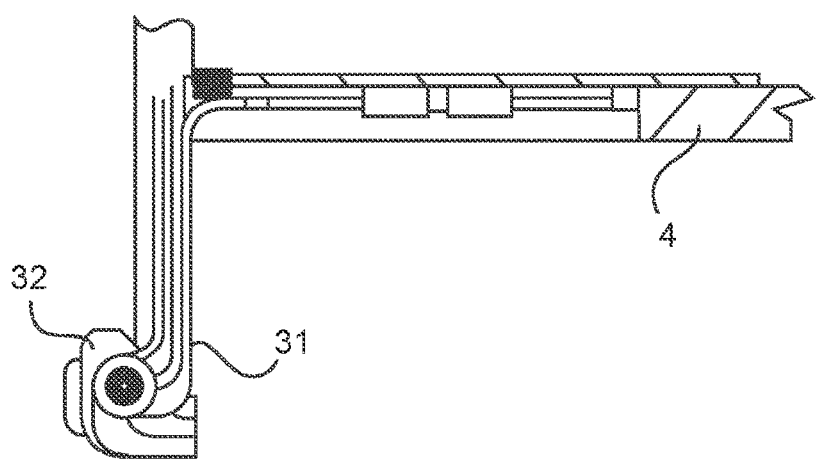

Because the retaining body 4 is pivotably held it is necessary to lead electrical lines from the retaining body to a vehicle-fixed part. As shown in FIG. 5B this may take place in a cable guide directly by way of a hinge fitting 12 or by way of a separate fitting for guiding the electrical connection. The corresponding electrical line 31 is routed from the connector device 30 to the particular hinge fitting 12, where the line 31 subsequently is routed in or on a bearing fitting 32. As an alternative to the aforesaid there would be the option of implementing this connection by way of a slip ring combination (not shown in detail).

Figure 5C:
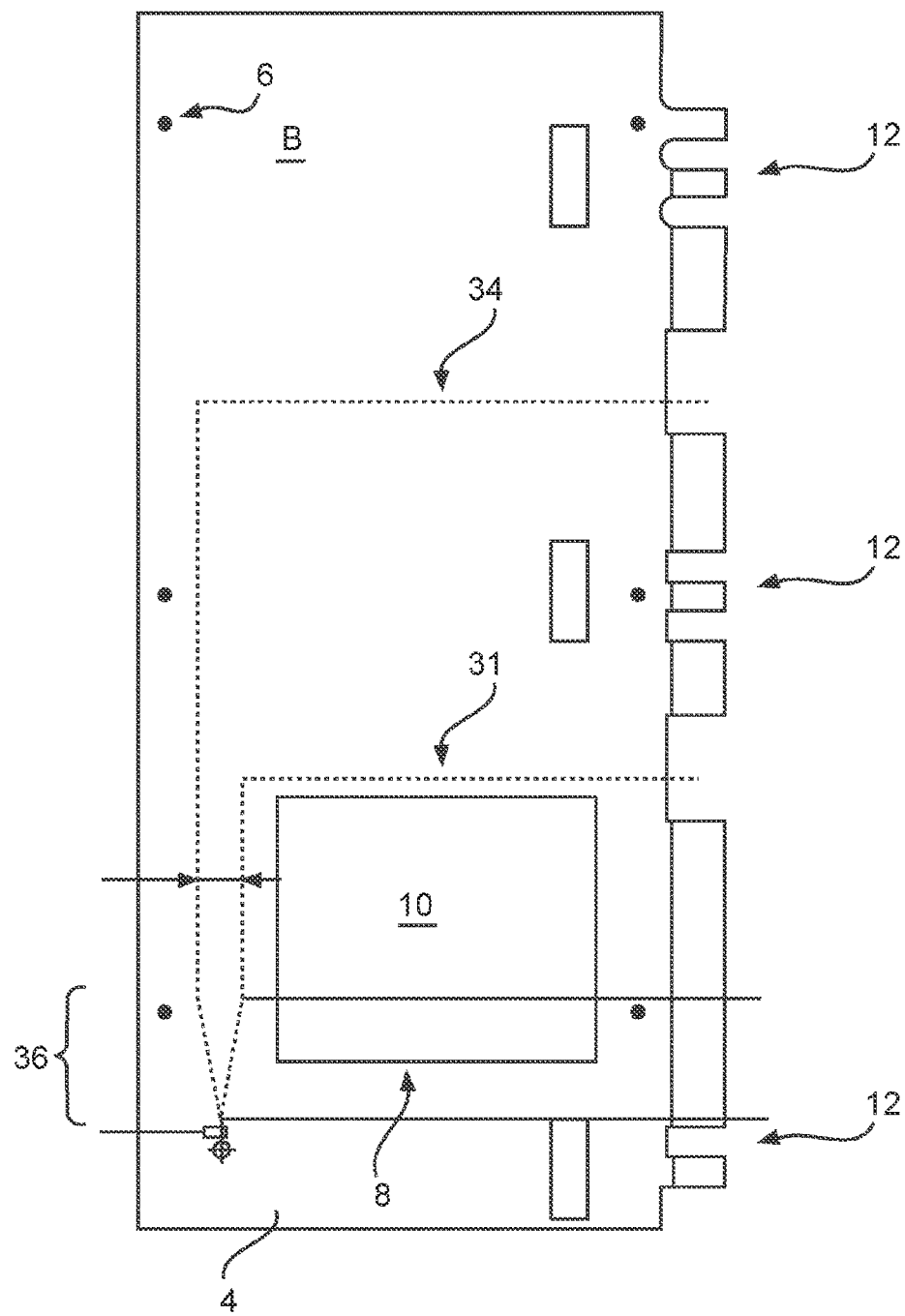

Because of the prescribed strict separation, in aircraft, of additional electrical lines 34 and a necessary electrical line for the handset 31, as shown in FIG. 5C these two lines may be routed by way of adjacent hinge fittings 12 or other, separate, fittings. When routing the connector device 30 to the respective hinge fitting 12 it must be ensured that, apart from a transition region 36, the lines 31 and 34 are always spaced apart from each other by at least one inch or more.

The adapter 2 according to the present disclosure may, in one example, be used in an aircraft cabin. This provides a particularly compact and space-saving arrangement of components within the aircraft cabin. It makes sense to arrange the adapter in one example, in so-called dead ends, which are defined as narrow places that are not used as escape routes. The figures below show various positions within an aircraft cabin, in which positions the adapter may generally be mounted. The following explanations and illustrations are by no means exhaustive, they have been provided to suggest to the average person skilled in the art to consider these or similar variants.

Figure 6A:
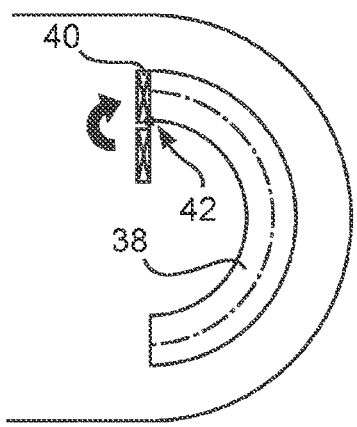
FIGS. 6A to 6H show various cabin arrangements with a cabin attendant seat that may be pivoted over an adapter.

FIG. 6A shows, for example, a stairway 38 that interconnects two vehicle decks. Diagrammatically shown is an arrangement comprising an adapter 2 and a vehicle seat 18, hereinafter always referred to as a pivotable vehicle seat 40 that is pivotable on a hinge axis 42. An in-use position provides for the pivotable vehicle seat 40 to be situated fully in front of the stairway 38. In a stowed position the pivotable vehicle attendant seat 40 is, for example, pivoted by 180° on the hinge axis 42 so that unhindered access to the stairway 38 is possible. In alternative embodiments, depending on the geometry of the surroundings, pivoting movements of around 90° or around 270° are also imaginable, as shown below with reference to further figures. It is thus not necessary for a vehicle attendant seat to be arranged on a fixed wall or the like; instead, it can merely be pivoted, as required, to a region that must not permanently be used. This arrangement may also assume the function of a barrier to a stairway in order to block off said stairway in the case of considerable vehicle movement, for example in a cabin of an aircraft during takeoff and landing.

Figure 6B:
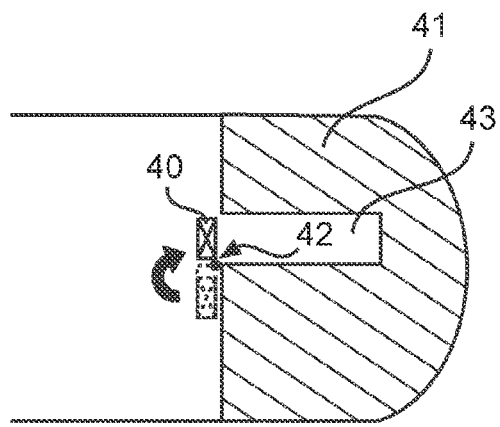

In a similar manner, FIG. 6B shows a pivotable vehicle attendant seat 40 that may be pivoted in front of a short aisle 43, wherein this short aisle 43 may also form part of a stairway. Since the aisle 43, for example, only leads to a toilet arrangement, to an arrangement of stowage compartments, or to areas of separate use (shared space, prayer room, rest compartments) 41, and is not used as an emergency escape route, the pivotable vehicle attendant seat 40 in an in-use position may fully block off the access opening to the aisle 43.

Figure 6C:
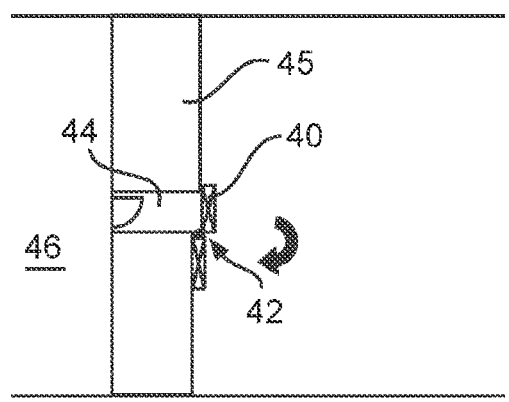

As shown in FIG. 6C it is also possible for the space in front of an access aisle 44 in a monument 45 to a cockpit 46 to be blocked off by a vehicle attendant seat 40 in the in-use position.

Figure 6D:
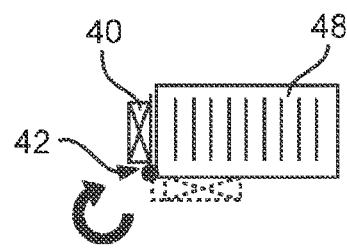

Merely for the sake of completeness it should be pointed out that, of course, pivoting movements of more or less than 180° may be necessary. FIG. 6D, for example, shows a pivotable vehicle attendant seat 40 that is arranged, so as to be pivotable by 270°, on a monument 48 that may also be a stairway or a compartment. Thus the hinge axis 42 may be arranged on a corner of the monument.

Figure 6E:
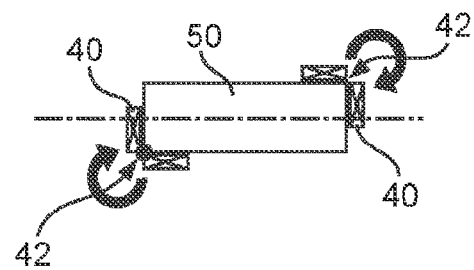

In contrast to this, an alternative view of FIG. 6E shows the use of two vehicle attendant seats 40 on two diametrically opposed corners of a monument 50.

Figure 6F:
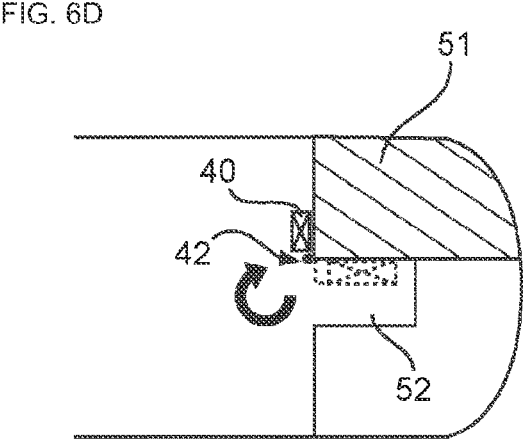

FIG. 6F furthermore shows a variant in which the pivotable vehicle attendant seat 40 may be pivoted on a corner of part of a monument 51, wherein in an in-use position the vehicle attendant seat is arranged outside an aisle 52, while in a stowed position it is, however, arranged within the aisle 52. This requires pivoting by 270°.

Figure 6G:
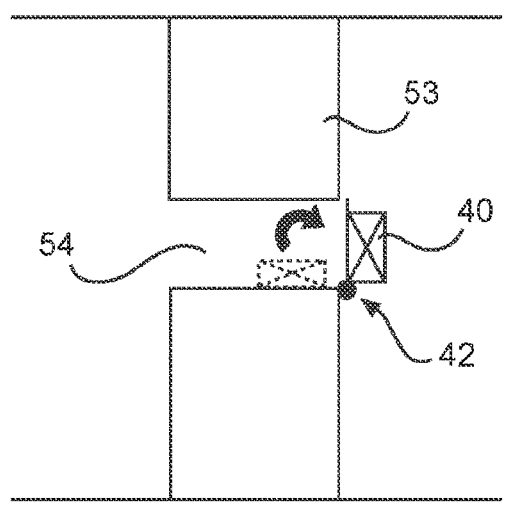

FIG. 6G shows a somewhat modified variant in which a vehicle attendant seat 40 may be pivoted to an aisle 54 of a monument 53 so that in an in-use position it is situated directly in front of the aisle 54. This only requires a pivoting movement of 90°.

Figure 6H:
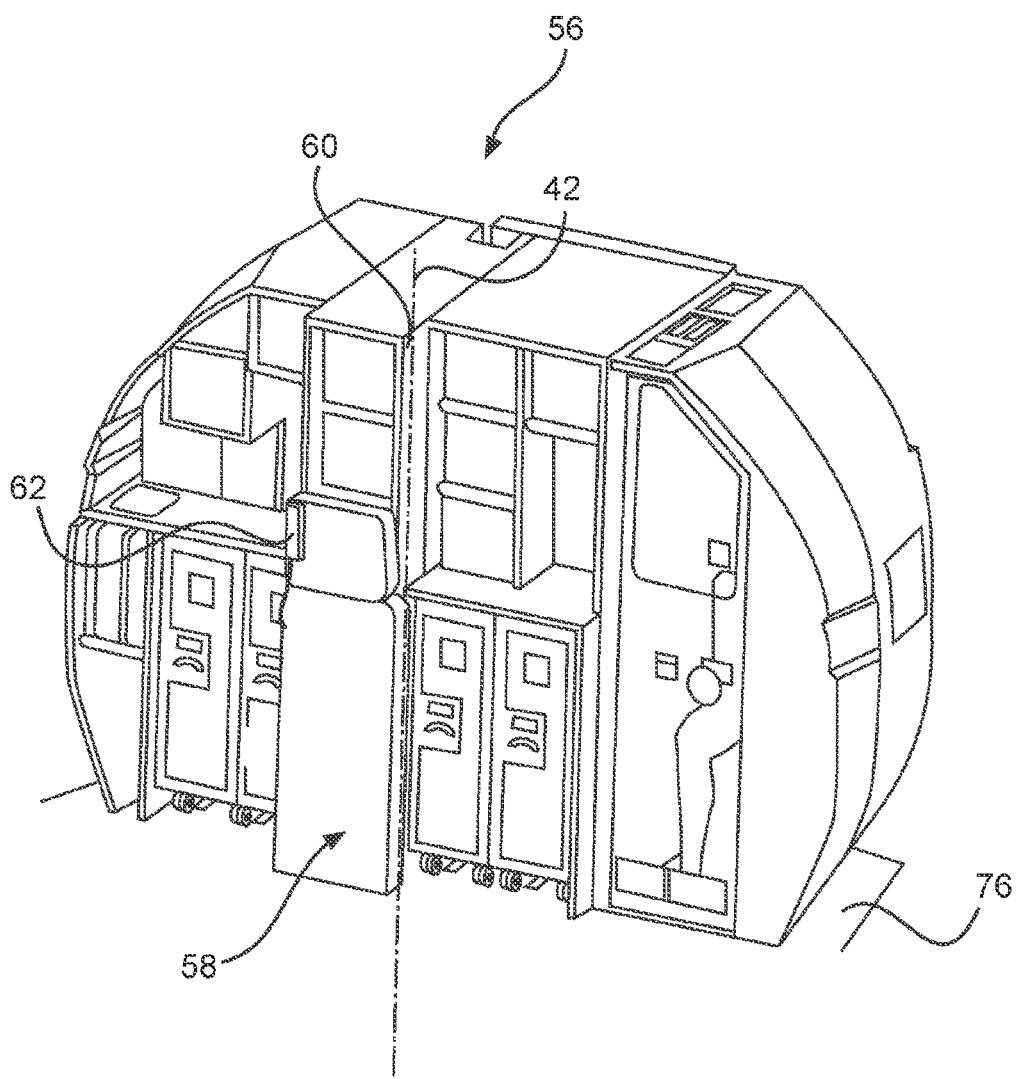

FIG. 6H shows a modular monument 56, arranged on a floor area 76 in a cabin of an aircraft, which monument 56 comprises a cabin attendant seat 58 that by means of an adapter 2 is pivotably held on the hinge axis 42 on a wall 60 of the monument 56. This makes it possible to use stowage compartments and parking spaces for trolleys while at the same time arranging a seat 58 on a wall situated in-between in order to create significantly improved use of space. Furthermore, as an example, the diagram shows a handset 62 that may be electrically connected according to the solutions shown in FIGS. 5A to 5C.

Figure 7A:
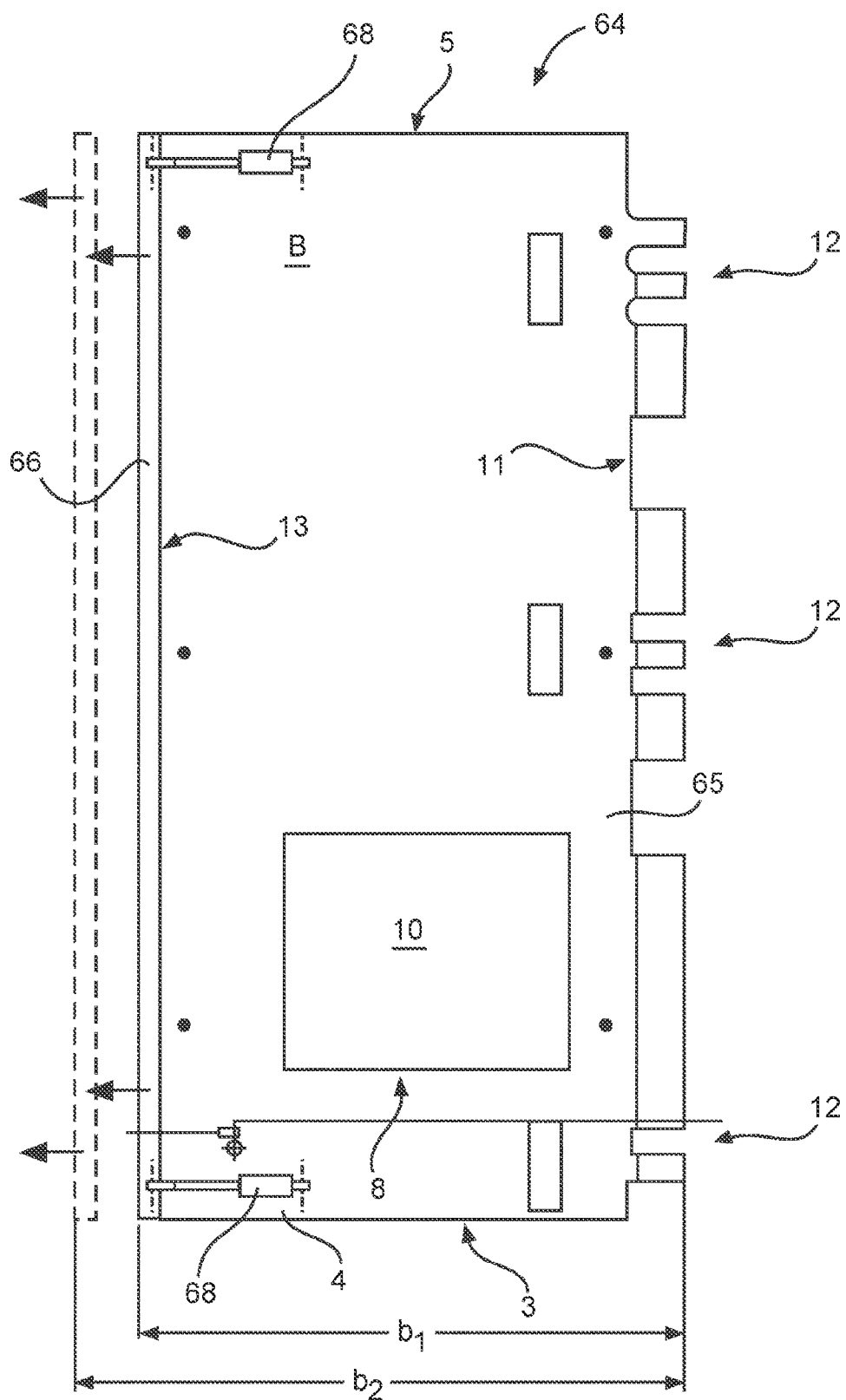
FIGS. 7A to 7B show two embodiments of an adapter with adjustable width (FIG. 7A) and with a foldable supporting mechanism (FIG. 7B).

For use as a barrier, an adapter 64, shown as an example in FIG. 7A, with a retaining body 65 may be used, which adapter 64 comprises a limitation component 66 that has a telescopic guide comprising, as an example, two telescopic rods 68. The limitation component 66 may thus be shifted to the left-hand side in the drawing plane in order to block off an opening situated behind the adapter 64, which opening is wider than the retaining body 65 in the retracted state. The width of the retaining body 65 may, for example, be changed from a first width $b_1$ to a second width $b_2$. The illustration is to be interpreted only as an example; wider widths are of course imaginable.

Figure 7B:
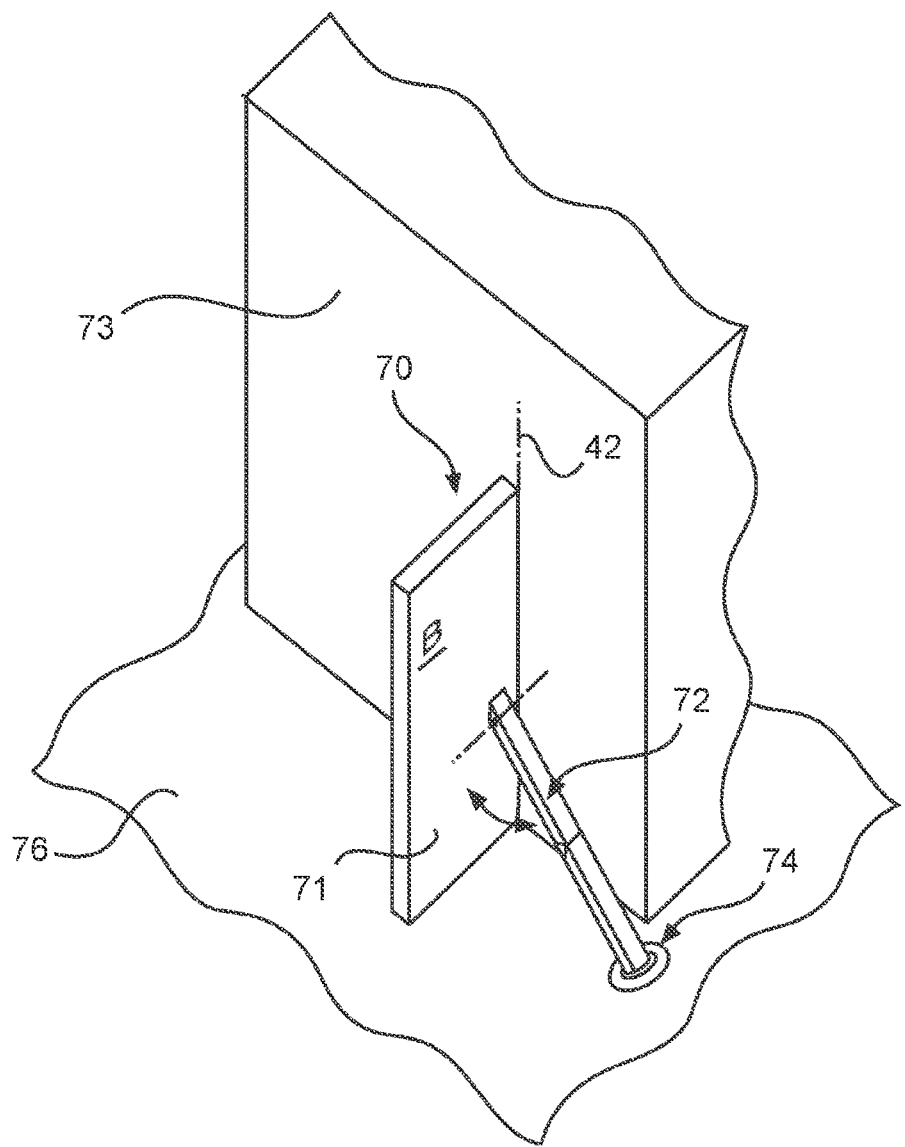

Finally, FIG. 7B shows an adapter 70 with a retaining body 71 which, for example, at its rear B comprises a foldable support 72 and is pivotably held on a monument 73, wherein in a pivoted position the support 72 may be supported in a securing means 74 that, as an example, is installed in a floor area 76 so as to be flush. Of course, alternative mechanisms are also imaginable.

Individual representations may of course also be used in a symmetrical manner within a vehicle cabin, wherein the symmetry may be a point symmetry or an axial symmetry. This means that in particular in larger aircraft cabins with several aisles each aisle may have an identical arrangement. In the use of vehicle attendant seats 40 it is important anyway to ensure that when the vehicle attendant seat is in an in-use position, the view from it onto an aisle is unimpeded.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An adapter for receiving a vehicle attendant seat in a cabin of a vehicle, comprising:
   a retaining body with an upper edge, a lower edge, a height and a width, taken up by a pivoting edge and outer contours of the retaining body span a plane,
   a receiving device for a vehicle attendant seat,
   at least one first pivoting device, the at least one first pivoting device arranged on the pivoting edge of the retaining body and is adapted to form a hinge with at least one correspondingly formed second pivoting device, and
   at least one first securing device,
   wherein the receiving device is arranged on a surface of the retaining body, which surface extends parallel to the plane, for mechanically connecting the vehicle attendant seat with the retaining body and wherein the retaining body comprises an access opening with a closure means that is openable, said access opening is arranged in a region facing the lower edge of the retaining body in order to reach a stowage compartment in the vehicle attendant seat from a side of the retaining body which side is opposite the receiving device.

2. The adapter of claim 1,
   wherein the at least one first securing device is arranged on the retaining body so as to be spaced apart from the at least one first pivoting device.

3. The adapter of claim 1,
   wherein the at least one first securing device is arranged on a securing edge that is situated opposite the pivoting edge.

4. The adapter of claim 1,
   wherein the width of the retaining body is smaller than the height of the retaining body.

5. The adapter of claim 1,
   wherein the retaining body is adapted for taking up a variable width.

6. The adapter of claim 1,
   further comprising an electrical connector device that is arranged on the retaining body.

7. The adapter of claim 6,
   further comprising at least one electrical line that extends from the electrical connector device to the pivoting edge.

8. The adapter of claim 6,
   wherein the electrical connector device is arranged in a region near the lower edge of the retaining body.

9. The adapter of claim 6,
   wherein the at least one electrical line is placed over the at least one first pivoting device in order to be led to a vehicle-fixed part by way of at least one second pivoting device.

10. The adapter of claim 6,
    wherein the at least one electrical line is connected to a rotatable slip ring arrangement that is arranged on the at least one first pivoting device.

11. The adapter of claim 1,
    further comprising a foldable supporting device that is arranged on a side of the retaining body, which side is opposite the receiving device, for connecting, by its end facing away from the retaining body, to a vehicle-fixed part.

12. A cabin arrangement in a vehicle, comprising:
    a floor area,
    at least one cabin equipment component with at least one second pivoting device, and
    an adapter, connected by way of at least one first pivoting device to the at least one second pivoting device, the adaptor including:
    a retaining body with an upper edge, a lower edge, a height and a width, taken up by a pivoting edge and outer contours of the retaining body span a plane,
    a receiving device for a vehicle attendant seat,
    the at least one first pivoting device, the at least one first pivoting device arranged on the pivoting edge of the retaining body to form a hinge with the at least one second pivoting device, and
    at least one first securing device,
    wherein the receiving device is arranged on a surface of the retaining body, which surface extends parallel to the plane, for mechanically connecting the vehicle attendant seat with the retaining body and wherein the retaining body comprises an access opening with a closure means that is openable, said access opening is arranged in a region facing the lower edge of the retaining body in order to reach a stowage compartment in the vehicle attendant seat from a side of the retaining body which side is opposite the receiving device.

13. The cabin arrangement of claim 12,
    further comprising a second securing device, arranged on the at least one cabin equipment component, and the second securing device is shaped so as to correspond to the at least one first securing device of the adapter,
    wherein the at least one second pivoting device and the at least one second securing device are arranged in such a manner on the at least one cabin equipment component that the adapter in an in-use position closes an opening defined by the at least one cabin equipment component.

14. The cabin arrangement of claim 13,
wherein the opening is a through-opening.
15. The cabin arrangement of claim 13,
wherein the opening is associated with an inwards-directed offset of the at least one cabin equipment component.
16. The cabin arrangement of claim 12,
wherein the at least one cabin equipment component is selected from a group of cabin equipment components, with the group comprising:
a toilet module,
a galley module,
a stowage module,
a rest compartment module,
a stairway access,
a partition wall to a cockpit,
a shared space,
a prayer room,
a smokers' module,
an electronics module,
a service module,
a lavatory,
a dressing room,
a wardrobe,
a bar module,
a reception module, and
combinations thereof.
17. A vehicle, comprising:
at least one cabin arrangement including a floor area, at least one cabin equipment component with at least one second pivoting device and an adaptor, the adaptor connected by way of at least one first pivoting device to the at least one second pivoting device, the adaptor including:
a retaining body with an upper edge, a lower edge, a height and a width, taken up by a pivoting edge and outer contours of the retaining body span a plane,
a receiving device for a vehicle attendant seat, and
the at least one first pivoting device, the at least one first pivoting device arranged on the pivoting edge of the retaining body to form a hinge with the at least one second pivoting device,
wherein the receiving device is arranged on a surface of the retaining body, which surface extends parallel to the plane, for mechanically connecting the vehicle attendant seat with the retaining body and wherein the retaining body comprises an access opening with a closure means that is openable, said access opening is arranged in a region facing the lower edge of the retaining body in order to reach a stowage compartment in the vehicle attendant seat from a side of the retaining body which side is opposite the receiving device.
18. The vehicle of claim 17, further comprising:
at least one first securing device of the adaptor, and
a second securing device, arranged on the at least one cabin equipment component, and the second securing device is shaped so as to correspond to the at least one first securing device,
wherein the at least one second pivoting device and the at least one second securing device are arranged in such a manner on the at least one cabin equipment component that the adapter in an in-use position closes an opening defined by the at least one cabin equipment component.
19. The vehicle of claim 18,
wherein the opening is a through-opening.

* * * * *